(12) United States Patent
Kim et al.

(10) Patent No.: US 8,688,942 B2
(45) Date of Patent: Apr. 1, 2014

(54) METHOD AND SYSTEM CONTROLLING PAGE OPEN TIME FOR MEMORY DEVICE

(75) Inventors: Jung-rae Kim, Seongnam-si (KR); Woo-il Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 330 days.

(21) Appl. No.: 12/642,927

(22) Filed: Dec. 21, 2009

(65) Prior Publication Data

US 2010/0161915 A1 Jun. 24, 2010

(30) Foreign Application Priority Data

Dec. 22, 2008 (KR) .......................... 10-2008-0131195

(51) Int. Cl.
*G06F 12/00* (2006.01)

(52) U.S. Cl.
USPC .................................. 711/167; 711/E12.069

(58) Field of Classification Search
USPC ........................................................ 711/167
See application file for complete search history.

(56) References Cited

U.S. PATENT DOCUMENTS

| 6,212,598 | B1 | 4/2001 | Jeddeloh |
| 2003/0126354 | A1* | 7/2003 | Kahn et al. ..................... 711/105 |
| 2005/0060533 | A1* | 3/2005 | Woo et al. ..................... 713/100 |

* cited by examiner

*Primary Examiner* — Reginald Bragdon
*Assistant Examiner* — Hamdy S Ahmed
(74) *Attorney, Agent, or Firm* — Volentine & Whitt, PLLC

(57) ABSTRACT

A method and apparatus adaptively controlling a page open time for a memory device are disclosed. The method includes determining a page open maintenance time of an access-requested page based on system information and intellectual property (IP) request information; and controlling closing of an open page based on the determined page open maintenance time.

19 Claims, 4 Drawing Sheets

METHOD AND SYSTEM CONTROLLING PAGE OPEN TIME FOR MEMORY DEVICE

CROSS-REFERENCE TO RELATED APPLICATION

This application claims the benefit of Korean Patent Application No. 10-2008-0131195 filed on Dec. 22, 2008, the subject matter of which is hereby incorporated by reference.

BACKGROUND

The inventive concept relates to a method and system controlling the operation of a constituent memory device. More particularly, the inventive concept relates to a method and system adaptively controlling a page open time for a memory device.

In general, a memory device accesses stored data using an address that indicates one or more memory cells in a memory cells array arranged in a matrix of row and columns. The address is in effect a composite formed by a row address and a column address. Memory cells associated with (i.e., activated by) a particular row address are commonly referred to as "a page", and the memory cell array within a memory device may be accessed as a collection of pages.

As demands for higher data access speed and lower power consumption drive the development of contemporary memory devices, the development of a technology to effectively control the length of time a particular page is "open" (i.e., is activated) has become increasingly important.

SUMMARY

Embodiments of the inventive concept provide a method of controlling a page open maintenance time for a memory device based on memory use patterns and characteristics of the application being used. Embodiments of the inventive concept also provide a memory system controlling a page open maintenance time based on memory use patterns and application characteristics. Further embodiments of the inventive concept provide a storage medium having recorded thereon a computer program executing a method of controlling a page open maintenance time for a memory device based on memory use patterns and application characteristics.

According to an aspect of the inventive concept, there is provided a method of controlling a page open time of a memory device, the method including determining a page open maintenance time of an access-requested page based on system information and intellectual property (IP) request information; and controlling closing of an open page based on the determined page open maintenance time.

The system information may include at least one of the group consisting of used software program information, IP operational frequency information and operating temperature information.

The IP request information may include at least one of a group consisting of used IP information, IP internal ID information, access address information, read/write request information, data request size information and data request cycle length information.

The page open maintenance time may be determined by using a lookup table storing page open maintenance times, based on information items included in the system information and the IP request information.

The page open maintenance time may be determined according to a possibility of repeated access requests to the same page based on memory use patterns according to the IP request information and the system information.

The page open maintenance time may be calculated as an average value of weights of page open maintenance times based on priorities of information items included in the system information and the IP request information.

The page open maintenance time may be determined to be inversely proportional to an IP operation frequency.

The page open maintenance time may be determined to be inversely proportional to an operation temperature.

The access-requested page may be closed due to a precharge instruction delayed by the determined page open maintenance time.

A read or write instruction may be directly executed without a page opening instruction if a new memory access request is generated for the access-requested page between when access to the access-requested page is terminated and until before the determined page open maintenance time is reached.

According to another aspect of the inventive concept, there is provided a memory system including a memory controller generating a control signal for memory access according to intellectual property (IP) request information, and controlling a page open maintenance time of an access-requested page based on the IP request information and system information; and a memory device reading or writing data according to the control signal.

The memory controller may control the page open maintenance time according to priorities of information items included in the system information and the IP request information.

The memory controller may control the page open maintenance time according to a possibility of repeated access requests to the same page based on memory use patterns according to the IP request information and the system information.

The memory controller may control the page open maintenance time to be as long as a possibility of repeated access requests to the same page is high, based on memory use patterns according to the IP request information and the system information.

The memory controller may generate a control signal for directly executing a read or write instruction without generating a control signal for page opening, if a new memory access request is generated for an open page between when access to the access-requested page is terminated and until before the determined page open maintenance time is reached.

The memory controller may include a page open maintenance time determination unit generating page open maintenance time information regarding the access-requested page based on the IP request information and the system information; and a memory control signal generation unit generating a control signal for memory access according to the IP request information, and controlling a page open time after the access-requested page is accessed, based on the page open maintenance time information.

The page open maintenance time determination unit may include a lookup table storing the page open maintenance time information based on memory use patterns according to information items included in the IP request information and the system information; and a page open maintenance time calculation unit calculating the page open maintenance time by extracting the page open maintenance time information corresponding to information items included in the IP request information and the system information, from the lookup table.

The memory control signal generation unit may include a counter starting counting from when access to the access-requested page is terminated, and generating a first signal when a counted value reaches a value of a time corresponding to the page open maintenance time information; a decoder decoding information included in the IP request information and required for memory access; a decoding information pool storing the information decoded by the decoder; a finite state machine (FSM) performing state transitions among a pre-charge state, an activation state and a read/write state according to the information stored in the decoding information pool, and, if the first signal is generated, generating a second signal for transitioning to the precharge state; and a scheduler generating a memory control signal by using the information stored in the decoding information pool, according to a timing corresponding to the second signal.

According to another aspect of the inventive concept, there is provided a storage medium having recorded thereon computer program codes for executing a method of controlling a page open maintenance time of a memory device based on memory use patterns and characteristics of a used application.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Embodiments of the inventive concept will now be described with reference to the attached drawings. However, it will be understood that the inventive concept may be variously embodied and should not be construed as being limited to only the illustrated embodiments. Rather, the illustrated embodiments are presented as teaching examples.

Figure 1:
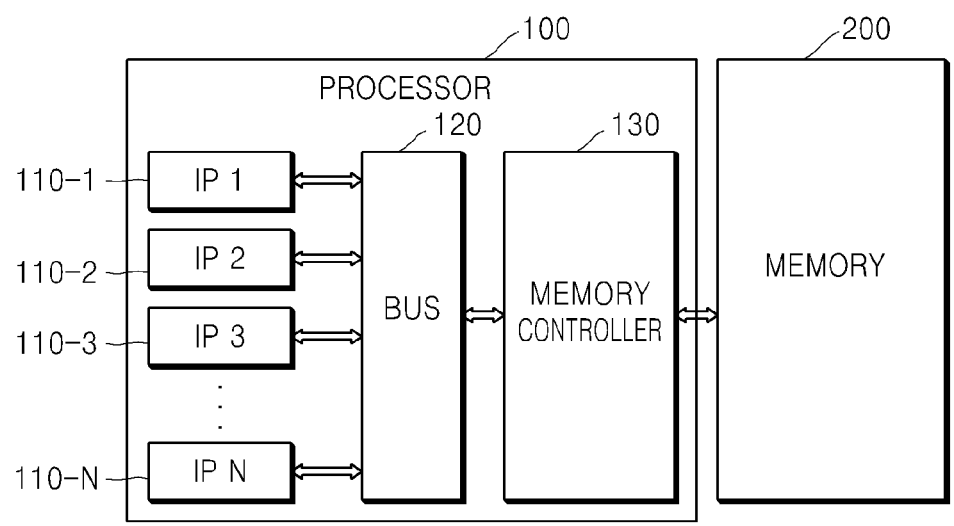
FIG. 1 is a block diagram of a memory system according to an embodiment of the inventive concept.

FIG. 1 is a block diagram of a memory system according to an embodiment of the inventive concept. Referring to FIG. 1, the memory system generally comprises a processor 100 and a memory device 200.

In the illustrated embodiment, the processor 100 comprises a plurality of intellectual property (IP) blocks 110-1 through 110-N, a bus 120 and a memory controller 130. Alternatively, only one IP block may exist in the processor 100.

An IP block is a functional block (e.g., hardware, software, and/or firmware) capable of processing data read from memory 200. Thus, an IP block may be any functional block applying or performing one or more functions in relation to data retrieved from memory 200. Exemplary IP blocks include an audio decoder block and a video decoder block. Each IP block may be allocated distinct IP-related data associated with the IP block (i.e., capable of identifying the corresponding IP block). When a data request is received from an external device (e.g., a host device controller, an external memory controller or processor, etc.), certain IP request information including so-called "IP information"—which was allocated to the IP block—may be sent to the memory device along with the data request. Thereafter, data may be read from memory device 200 in accordance with the received IP information and provided to the IP block.

Memory device 200 may be a synchronous or asynchronous memory device.

Each of the IP blocks 110-1 through 110-N gets permission to use the bus 120 according to a bus arbitration program and transmits IP request information to the memory controller 130 via the bus 120 in order to request memory access.

The memory controller 130 generates a memory control signal for performing the requested memory access based on the received IP request information and transmits the memory control signal to the memory device 200. In response, the memory device 200 opens the requested page per the received memory control signal, performs a read/write operation on the open page, and then closes the page before performing a precharge operation.

If the page is closed right after the requested memory access is performed, power consumption may be reduced. However, if access to the same page is repeatedly requested, the operation for re-opening the same page for each successive data access request increases data access time. Additionally, if page open time is overly long in its definition power consumption is unnecessarily increased during periods wherein the occurrence of repeated data access requests to the same page is low.

Embodiments of the inventive concept address these issues and provide a scheme whereby the definition and maintenance of a page open time for a memory may be adaptively controlled based on memory use patterns. Accordingly, in the illustrated embodiment of FIG. 1, the memory controller 130 is configured to control a page open maintenance time for an access-requested page based on received IP request information, as well as overall memory system information. This scheme will be described in some additional detail with reference to FIG. 2.

Figure 2:
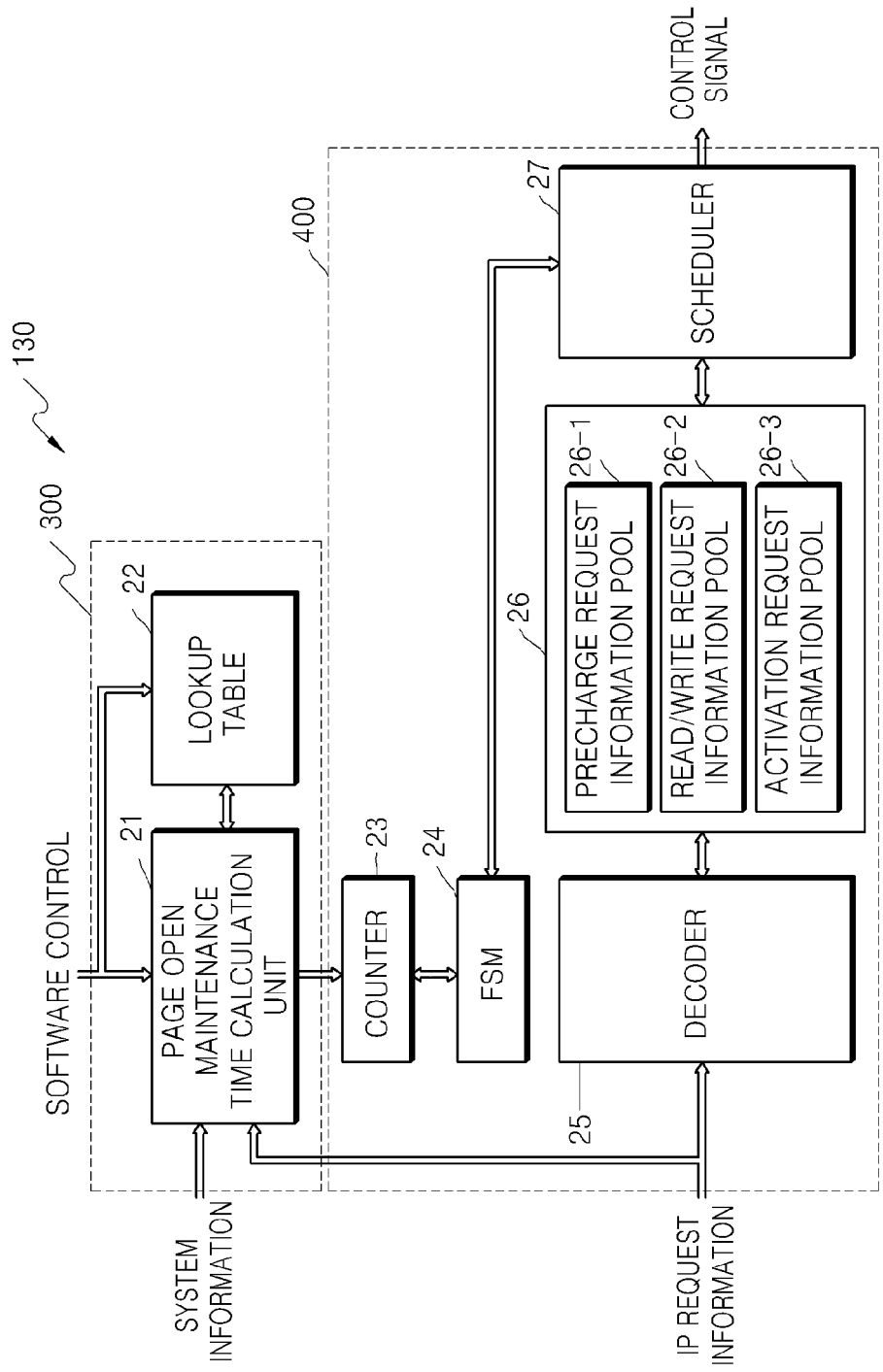
FIG. 2 further illustrates the memory controller of the memory system illustrated in FIG. 1.

FIG. 2 is a more detailed structural diagram of the memory controller 130 of FIG. 1. Referring to FIG. 2, the memory controller 130 comprises a page open maintenance time calculation unit 21, a lookup table 22, a counter 23, a finite state machine (FSM) 24, a decoder 25, a decoding information pool 26 and a scheduler 27.

In the illustrated embodiment of FIG. 2, the decoding information pool 26 specifically includes a precharge request information pool 26-1, a read/write request information pool 26-2 and an activation request information pool 26-3.

In the above structure, a first block including the page open maintenance time calculation unit 21 and the lookup table 22 is referred to as a page open maintenance time determination unit 300, and a second block including the counter 23, the FSM 24, the decoder 25, the decoding information pool 26 and the scheduler 27 is referred to as a memory control signal generation unit 400.

The lookup table 22 stores page open maintenance time information based on information items included in IP request information and system information. Here, the page open maintenance time information represents a time for delaying closing of an open page after terminating access to the open page.

The IP request information includes used IP information, IP internal identification (ID) information, access address information, read/write request information, data request size information and data request cycle length information. The system information includes used software program information, IP operation frequency information and operation temperature information.

Basically, when the lookup table 22 is designed, a page open maintenance time is set according to the possibility of repeated access requests to the same page, based on memory use patterns according to the IP request information and the system information. That is, the page open maintenance time is set to be as long as the possibility that repeated access requests to the same page, based on the memory use patterns according to the IP request information and the system information is high.

The page open maintenance time to be stored in the lookup table 22 may be set using any of the following standards based on each of the information items included in the system information and the IP request information.

In some additional detail, a page open maintenance time may be set based on the used software program information included in the system information. For example, a page open maintenance time may be set to be greater during a video decoding program than during an audio decoding program. As another example, a page open maintenance time may be set to be greater during an Internet browsing program than during the video decoding program. Also, a page open maintenance time may be set to be inversely proportional to an IP block operational frequency. That is, a page open maintenance time may be reduced in duration as the operational frequency for a particular IP block rises. A page open maintenance time may also be set to be inversely proportional to a system operating temperature. That is, a page open maintenance time may be reduced as the operating temperature rises in order to reduce power consumption, but may be extended as the operating temperature falls in order to improve data access performance.

The page open maintenance time stored in the lookup table 22 may also be set by using the following standards according to the used IP information, the IP internal ID information, the access address information, the read/write request information, the data request size information and data request cycle length information included in the IP request information.

First, according to the used IP information, a page open maintenance time may be set to be relatively long with respect to an IP block that frequently requests access to the same page, and may also be set to be relatively short with respect to an IP block that does exhibit this relationship. For example, a page open maintenance time may be set to be relatively long with respect to a video decoder, which frequently requests access to the same page, but may be set to be relatively short with respect to an audio decoder which does not.

Second, a page open maintenance time may be differently set according to the IP internal ID information. For example, in a video decoder, a page open maintenance time may be set to be short with respect to a request for reading stream data, but may be set to be long with respect to a request for writing a decoding result.

Third, a page open maintenance time may be differently set according to the access address information. For example, a page open maintenance time may be set to be long with respect to a memory access request from an address that frequently requests access to the same page, but may be set to be short with respect to a memory access request from an address that does not frequently request access to the same page.

Fourth, a page open maintenance time may be differently set according to the read/write request information. That is, a page open maintenance time may be set to be long with respect to a read request, but may be set to be short with respect to a write request because read requests more frequently request access to the same page than write requests.

Fifth, a page open maintenance time may be differently set according to the data request size information. For example, a page open maintenance time may be set to be short with respect to an audio data access request for accessing 8-bit data, but may be set to be long with respect to a video data access request for accessing 128-bit data access.

Sixth, a page open maintenance time may be differently set according to the data request cycle length information. For example, a page open maintenance time may be set to be short with respect to a 1-cycle request—which is generally used to access audio data, but may be set to be long with respect to a 16-cycle request—which is generally used to access video data.

In the foregoing, and throughout this description the terms "short" and "long" are relative terms. Those skilled in the art will understand this relative period length definition in relation to the foregoing (and similar) factors.

A page open maintenance time may be determined through testing and/or modeling conducted during the memory system design process using the above-described standards based on the information items included in the IP request information and the system information. Alternatively or additionally, a page open maintenance time may be set by increasing/decreasing an initially-set default value by means of trial and error, or empirical testing.

The page open maintenance time calculation unit 21 obtains the page open maintenance time information corresponding to the information items of the received IP request information and the system information by using the lookup table 22, and then calculates the page open maintenance time with respect to a memory access request based on the obtained page open maintenance time information.

For example, an average value of page open maintenance times corresponding to the information items included in the IP request information and the system information may be calculated so as to determine the page open maintenance time.

In another example, priorities of the information items included in the IP request information and the system information may be set and the page open maintenance time may be set based on the set priorities. In more detail, a high weight may be set for a high priority, and an average value of weights of the page open maintenance times corresponding to the information items included in the IP request information and the system information may be calculated so as to determine the page open maintenance time.

In another example, page open maintenance times with respect to only high-priority items from among the information items included in the IP request information and the system information may be read from the lookup table 22 and an average value of the page open maintenance times may be calculated so as to determine the page open maintenance time.

Also, standards for determining page open maintenance times with respect to various information items included in the system information and the IP request information or priorities of the standards may be directly set by a user. In this case, information in the lookup table 22 and a page open maintenance time calculation method of the page open maintenance time calculation unit 21 may vary by controlling software.

The page open maintenance time determination unit 300 generates page open maintenance time information corresponding to the page open maintenance time calculated by the page open maintenance time calculation unit 21

The page open maintenance time information generated by the page open maintenance time determination unit 300 is transmitted to the counter 23.

If IP request information is applied to the memory controller 130, the decoder 25 decodes information required for the constituent memory access in order to provide precharge request information, read/write request information, and activation request information.

The precharge request information, the read/write request information and the activation request information output from the decoder 25 are respectively stored in the precharge request information pool 26-1, the read/write request information pool 26-2 and the activation request information pool 26-3.

The scheduler 27 receives information stored in the decoding information pool 26 and generates a memory control signal according to state transition timing control of the FSM 24.

Figure 3:
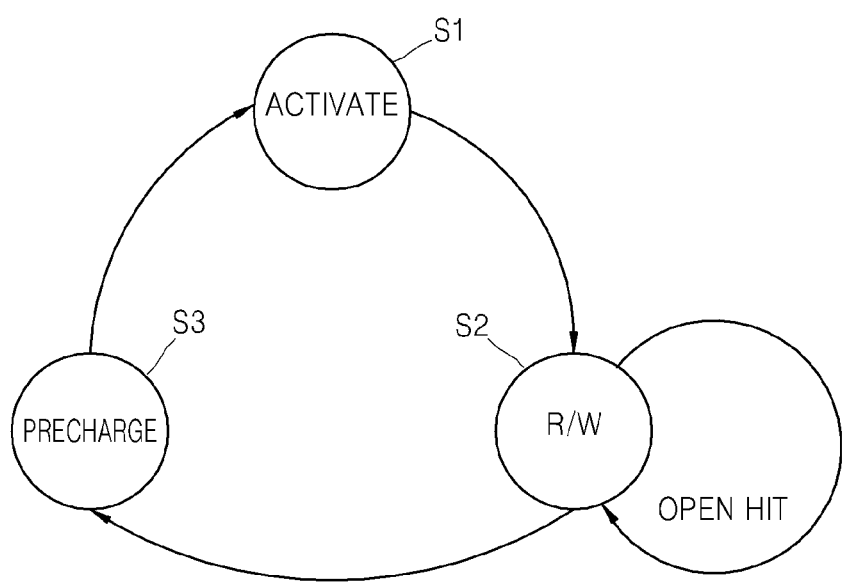
FIG. 3 is a conceptual diagram showing state transitions for a finite state machine (FSM) implemented by the memory controller illustrated in FIG. 2.

FIG. 3 is a conceptual diagram showing state transitions for the FSM 24 illustrated in FIG. 2. As shown in FIG. 3, the FSM 24 controls state transitions among an activation (activate) state S1, a read/write (R/W) state S2 and a precharge state S3 according to information stored in the decoding information pool 26. In the read/write state S2, the FSM 24 may control a read/write operation to be performed without state transiting under an open hit condition, wherein the condition refers to a case when an open page receives a new memory access request.

In particular, the FSM 24 controls a page close timing based on the page open maintenance time information generated by the page open maintenance time determination unit 300, as described below.

Initially, the page open maintenance time information generated by the page open maintenance time determination unit 300 is applied to the counter 23.

The counter 23 starts counting from when access to an access-requested page is terminated, and generates a page close signal when a counted value reaches a value of the page open maintenance time calculated by the page open maintenance time determination unit 300. If a page open hit is generated due to a new memory access request before the page close signal is generated, the counter 23 is reset when access to the page according to the new memory access request is terminated, and then restarts counting.

In a page open state, if the page close signal is input from the counter 23, the FSM 24 closes a page and generates a state transition control signal for transiting the state of the page into a precharge state. Alternatively, if a new memory access request is generated in the page open state and a page open hit is not generated by the new memory access request, the FSM 24 closes the open page even if the page close signal is not input and generates the state transition control signal for transiting the page into the precharge state.

The scheduler 27 receives information stored in the decoding information pool 26 according to state transition control signal generated by the FSM 24, and generates a memory control signal.

As such, the page open maintenance time is adaptively controlled according to the IP request information and the system information.

A method of controlling a page open time of a memory device, according to an embodiment of the inventive concept, will be described with reference to FIG. 4.

Figure 4:
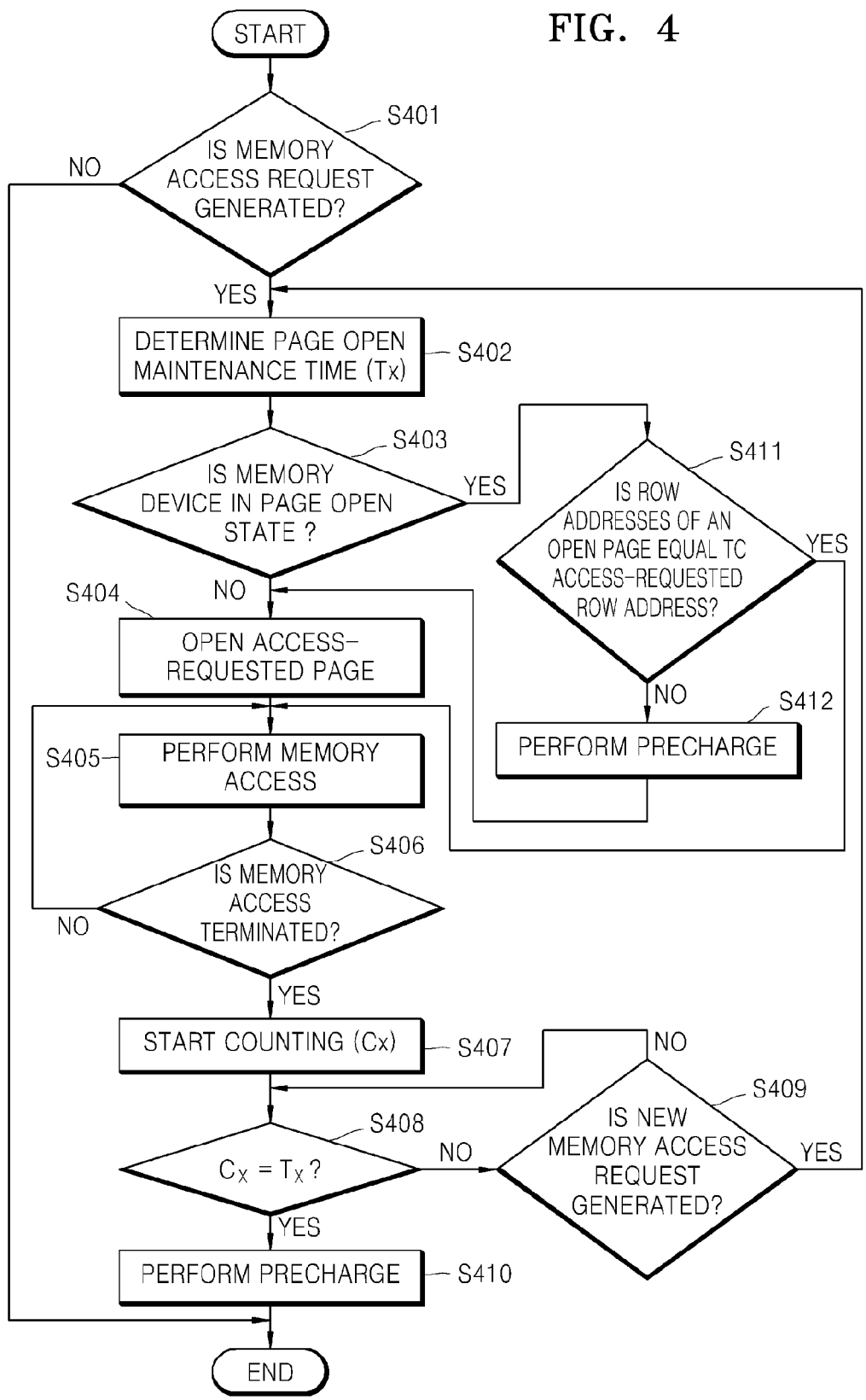
FIG. 4 is a flowchart summarizing a method of controlling page open time for a memory device according to an embodiment of the inventive concept.

FIG. 4 is a flowchart summarizing a method of controlling a page open time for a memory device according to an embodiment of the inventive concept. The method of FIG. 4 may be executed by the memory controller 130 illustrated in FIG. 1.

Referring to FIG. 4, the memory controller 130 first determines whether a memory access request is generated (S401). The memory access request is generated to read data stored in or write data into the memory device 200 illustrated in FIG. 1. Information regarding the memory access request is included in IP request information and is transmitted to the memory controller 130.

If the memory access request is generated, the memory controller 130 determines a page open maintenance time Tx (S402). The memory controller 130 determines the page open maintenance time Tx of an access-requested page based on the IP request information and system information. That is, the page open maintenance time Tx is extended with a higher probability of repeated data access requests to the same page based on memory use patterns according to the IP request information and the system information. A method of determining the page open maintenance time Tx will now be described in some additional detail with additional reference to FIG. 2.

Following the determination of a page open maintenance time Tx (S402), the memory controller 130 determines whether the memory device 200 is in a page open state (S403).

If it is determined that the memory device 200 is not in the page open state (S403=NO), the memory device 200 opens the access-requested page (S404). That is, the memory controller 130 generates an activation control signal with respect to an access-requested row address and transmits the activation control signal to the memory device 200. Then, the memory device 200 opens a page corresponding to a set of bit cells designated by the access-requested row address.

After the memory device 200 has finished opening the access-requested page (S404), a memory access operation is performed (S405). That is, a read/write operation is performed according to the received memory access request.

Then, it is determined whether the memory access according to the memory access request is terminated (S406). That is, it is determined whether the read or write operation on the access-requested row address is terminated.

Once it is determined that the requested memory access is terminated (S406=YES), the counter 23 illustrated in FIG. 2 in the memory controller 130 is reset and counting is started (S407). While the counter 23 operates, the memory controller 130 determines whether a counted value Cx provided by the counter 23 has reached the value of the page open maintenance time Tx previously determined (S408).

So long as it is determined that the counted value Cx is not equal to the value of the page open maintenance time Tx (S408=NO), a continuing determination is made as to whether a new memory access request is generated (S409). If it is determined that a new memory access request is generated (S409=YES), the method will return to a state defined by (S401=YES).

However, once it is determined that the counted value Cx is equal to the value of the page open maintenance time Tx (S408=YES), the open page is closed and a precharge operation is performed (S410).

However, if it is determined that the memory device 200 is in the page open state, (S430=YES), it is further determined whether a row address of an open page is equal to the access-requested row address (S411).

If it is determined that the row address of the open page is equal to the access-requested row address (S411=YES), the method skips to (S405) and memory access is directly performed without first executing a page opening process. That is, if a page open hit is generated due to the new memory access request before the open page is closed, a page opening process is not necessary and thus the memory access, (i.e., the read or write operation) may be directly performed.

However, if it is determined that the row address of the open page is not equal to the access-requested row address (S411=NO), the currently open page is closed and the precharge operation is performed (S412). This means that the open page is closed if a memory access request for a new page is generated even if the page open maintenance time Tx determined in the page open state is not reached. After the precharge operation (S412) is performed, the method skips to S404 in order to open the new access-requested page.

In the method summarized in FIG. 4, operations S402 and S403 may be designed to be simultaneously performed.

In addition, if the counted value Cx reaches an initially-set maximum page open maintenance time in a state when the access-requested page is open, the memory controller 130 may be designed to close the open page regardless of the determined page open maintenance time Tx. This is because, if repeated open hits are generated and thus a page is continuously open for a maximum allowable open maintenance time, the open page needs to be closed in order to protect data stored in the memory device 200.

As such, a page open maintenance time may be adaptively controlled according to IP request information and system information. That is, a time for delaying closing of an open page after requested memory access is performed may be controlled.

Various embodiments of the inventive concept may be implemented as a method, an apparatus, or a system. When implemented in software, various component elements may be defined by code segments for executing required operations. Programs or code segments may be stored in one or more processor-readable medium. The processor-readable medium may include any medium capable of storing information. While embodiments of the inventive concept have been particularly shown and described with reference to exemplary embodiments thereof, it will be understood that various changes in form and details may be made therein without departing from the scope of the following claims.

What is claimed is:

1. A method of controlling a page open time for a memory device, the method comprising:
    determining a page open maintenance time of an access-requested page based on system information and intellectual property (IP) request information including information identifying an IP block requesting access to the access-requested page; and
    controlling closing of an open page based on the determined page open maintenance time,
    wherein the system information comprises at least one of a group consisting of used software program information, IP operation frequency information and operation temperature information.

2. The method of claim 1, wherein the IP request information comprises at least one of a group consisting of used IP information, IP internal ID information, access address information, read/write request information, data request size information and data request cycle length information.

3. The method of claim 1, wherein the page open maintenance time is determined by using a lookup table storing page open maintenance times based on information items comprised in the system information and the IP request information.

4. The method of claim 1, wherein the page open maintenance time is determined according to a possibility of repeated access requests to the same page based on memory use patterns according to the IP request information and the system information.

5. The method of claim 1, wherein the page open maintenance time is calculated as an average value of weights of page open maintenance times based on priorities of information items comprised in the system information and the IP request information.

6. The method of claim 1, wherein the page open maintenance time is determined to be inversely proportional to an IP operational frequency.

7. The method of claim 1, wherein the page open maintenance time is determined to be inversely proportional to an operating temperature of the memory device.

8. The method of claim 1, wherein a read instruction or a write instruction is directly executed without a page opening instruction if a new memory access request is generated for the access-requested page between a time at which access to the access-requested page is terminated and a time at which the determined page open maintenance time is reached.

9. A memory system comprising:
    a memory controller configured to generate a first control signal for memory access according to intellectual property (IP) request information including information identifying an IP block requesting access to an access-requested page, and to control a page open maintenance time of the access-requested page based on the IP request information and system information; and
    a memory device configured to read/write data in response to the first control signal,
    wherein the system information comprises at least one of a group consisting of used software program information, IP operation frequency information and operation temperature information.

10. The memory system of claim 9, wherein the memory controller is further configured to control the page open maintenance time according to priorities of information items defined by at least one of the system information and the IP request information.

11. The memory system of claim 9,
    wherein the IP request information comprises at least one of a group consisting of used IP information, IP internal ID information, access address information, read/write request information, data request size information and data request cycle length information.

12. The memory system of claim 9, wherein the memory controller is further configured to control the page open maintenance time according to a possibility of repeated access requests to the same page based on memory use patterns according to the IP request information and the system information.

13. The memory system of claim 9, wherein the memory controller is further configured to control the page open maintenance time in response to a high possibility of repeated access requests to the same page based on memory use patterns according to the IP request information and the system information.

14. The memory system of claim 9, wherein the memory controller is further configured to generate a second control signal for directly executing a read/write instruction without generating a third control signal for page opening, if a new memory access request is generated for an open page between a time at which access to the access-requested page is terminated and a time at which the determined page open maintenance time is reached.

15. The memory system of claim 9, wherein the memory controller comprises:
a page open maintenance time determination unit configured to generate page open maintenance time information regarding the access-requested page based on the IP request information and the system information; and
a memory control signal generation unit configured to generate the first control signal for memory access according to the IP request information, and control a page open time after the access-requested page is accessed based on the page open maintenance time information.

16. The memory system of claim 15, wherein the page open maintenance time determination unit comprises:
a lookup table configured to store the page open maintenance time information based on memory use patterns according to information items included in the IP request information and the system information; and
a page open maintenance time calculation unit configured to calculate the page open maintenance time by extracting the page open maintenance time information corresponding to information items comprised in the IP request information and the system information, from the lookup table.

17. The memory system of claim 15, wherein the memory control signal generation unit comprises:
a counter configured to start counting when access to the access-requested page is terminated, and generate a first signal when a counted value reaches a value of a time corresponding to the page open maintenance time information;
a decoder configured to decode information in the IP request information and required for memory access;
a decoding information pool storing the information decoded by the decoder;
a finite state machine (FSM) configured to control state transitions between a precharge state, an activation state and a read/write state according to the information stored in the decoding information pool, and further configured to generate a second signal for transitioning to the precharge state upon receiving the first signal; and
a scheduler configured to generate a memory control signal using the information stored in the decoding information pool and in accordance with timing controlled by the second signal.

18. A memory system, comprising:
a memory device comprising memory cells arranged to be accessible in pages, and configured to read/write data to the memory cells in response to a control signal; and
a memory controller, comprising:
at least one input for connection to a bus and for receiving over the bus a memory access request for accessing a requested one of the pages of the memory device, the memory access request including system information and intellectual property (IP) request information including IP information identifying an IP block which generated the memory access request,
a page open maintenance time determination unit which receives the system information and the IP information from the bus via the at least one input, and which calculates a page open maintenance time for the requested page corresponding to the system information and the IP request information, and which outputs page open maintenance time information corresponding to the calculated page open maintenance time; and
a scheduler configured to output the control signal to the memory device in response to the page open maintenance time information so as to control a time when the requested page remains open,
wherein the system information comprises at least one of a group consisting of used software program information, IP operation frequency information and operation temperature information.

19. The memory system of claim 18, wherein the page open maintenance time determination unit comprises:
a lookup table configured to store the page open maintenance time information based on memory use patterns according to information items included in the IP request information and the system information; and
a page open maintenance time calculation unit configured to calculate the page open maintenance time by extracting the page open maintenance time information corresponding to the information items comprised in the IP request information and the system information, from the lookup table.

* * * * *